United States Patent [19]

McCormick

[11] 4,040,637

[45] Aug. 9, 1977

[54] LOW FRICTION BALANCED PISTON RING

[75] Inventor: Harold E. McCormick, Ballwin, Mo.

[73] Assignee: Ramsey Corporation, St. Louis, Mo.

[21] Appl. No.: 663,832

[22] Filed: Mar. 4, 1976

[51] Int. Cl.$^2$ ................................................ F16J 9/20
[52] U.S. Cl. .................................................. 277/224
[58] Field of Search ............... 277/195, 214, 215, 216, 277/217, 223, 224

[56] References Cited

FOREIGN PATENT DOCUMENTS

| 60,137 | 11/1938 | Norway | 277/224 |
| 156,490 | 3/1954 | Sweden | 277/224 |

*Primary Examiner*—Robert I. Smith

[57] ABSTRACT

A low friction piston ring of split annular construction has a circumferentially extending recess formed at its upper outer portion to define an outer radial ledge which divides the outer axial surface of the ring into a recessed outer face and a reduced (as compared to the total outer axial surface) bearing surface. The bearing surface preferably has a wear resistant coating thereon. The outside diameter of the recessed outer face is less than the outside diameter of the bearing surface by an amount at least equal to the radial wear depth of the bearing surface. A peripheral recess is also formed at the upper-inner portion of the ring to reduce or eliminate torsional twisting of the ring. The ring provides a reduction in frictional resistance between the ring and the cylinder wall, good sealing against gas blow-by and enhanced engine performance and exhaust emissions control.

16 Claims, 14 Drawing Figures

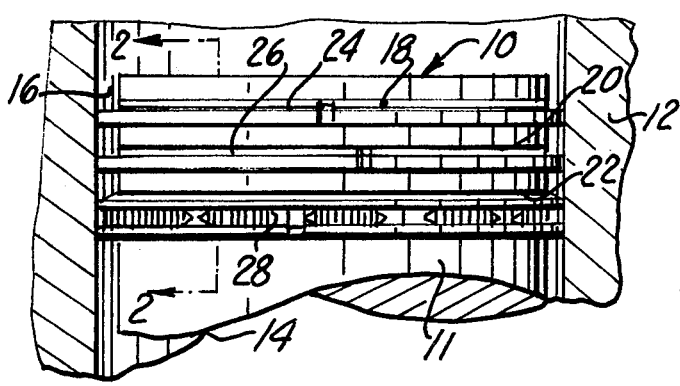
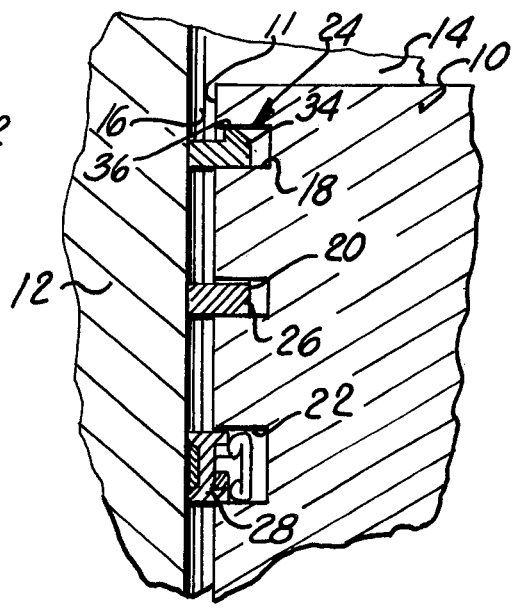
FIG. 1 FIG. 2
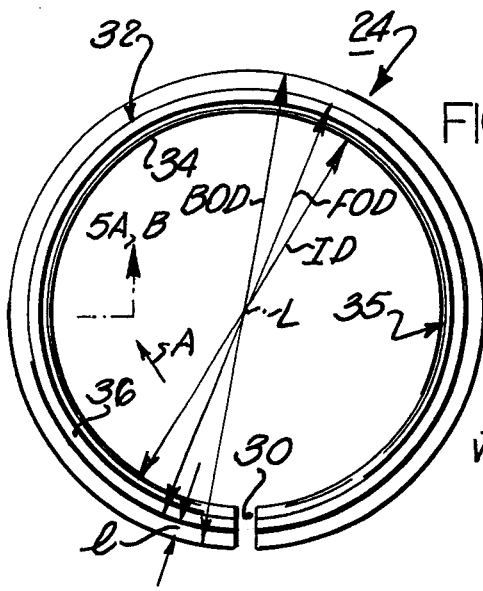
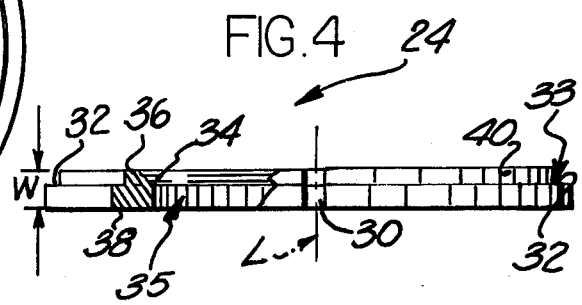
FIG. 3 FIG. 4
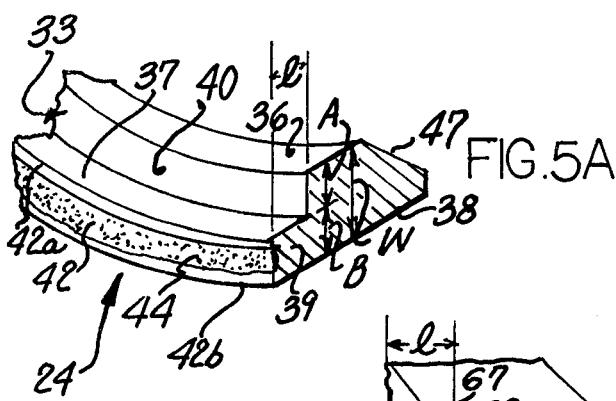
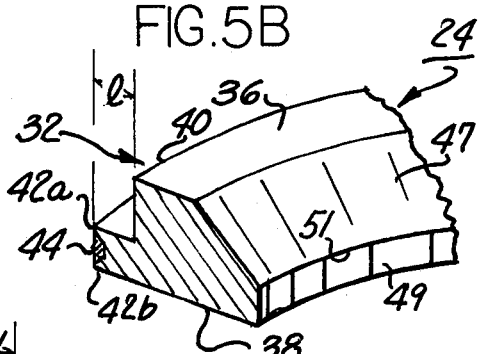
FIG. 5A FIG. 5B
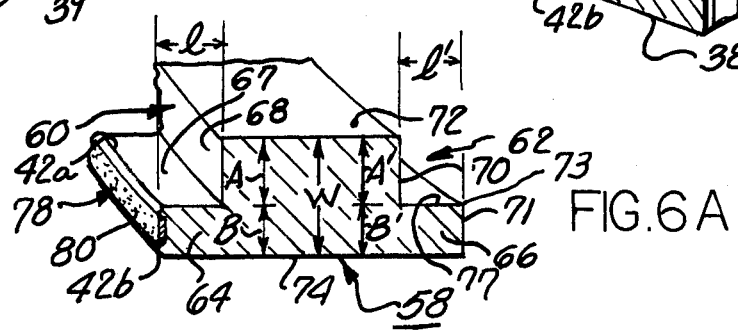
FIG. 6A

LOW FRICTION BALANCED PISTON RING

BACKGROUND OF THE INVENTION

This invention relates to piston rings for internal combustion engines, and more particularly to a compression ring for a reciprocating piston internal combustion engine. The compression rings of a reciprocating piston engine provide a sliding seal between the piston and cylinder wall to prevent combustion gases from leaking past the piston, ie, gas blow-by. More particularly, the present invention provides a compression ring which has a circumferential relief of L-shaped cross section provided at its upper-outer (diameter) portion to reduce the bearing contact area of the ring with the cylinder wall, and a corresponding circumferential relief at its upper-inner (diameter) portion to help balance the ring against twist and help to properly seat it in its seating groove.

It is known to the prior art to provide compression rings whose outer face is beveled or chamfered to provide an upwardly and inwardly inclined outer peripheral surface whereby the bearing contact area of the ring with the cylinder wall within which it is disposed is reduced. Such reduction helps to diminish bearing friction of the ring against the cylinder wall. It is further known to provide a bevel or chamfer on the upper inside peripheral surface of such rings. U.S. Pat. No. 3,337,938 of H. F. Prasse et al, assigned to the assignee of this application, shows such an arrangement, in the context of a torsion ring having a twisted configuration as shown in FIG. 9 of Prasse et al. The provision of symmetrical cut-outs to avoid unintentional torsion twisting of rings is shown in U.S. Pat. No. 2,423,017.

One difficulty with sloping contact faces of the compression ring is that wear of the bearing face reduces the effective back-pressure surface against which combustion gas pressure may act during the compression and power strokes to help balance the forces tending to thrust the ring against the cylinder wall.

Attempts to reduce the bearing surface contact of the ring against the cylinder wall simply by reducing the axial width of the ring and employing the full outer face ring surface in bearing contact are handicapped because such structure eliminates the back-pressure surface and because there is a limit to how thin the ring can be made. That is, sound ring castings cannot be reliably attained for rings of less than about 0.060 inch of axial width.

Another difficulty of prior art rings is that unintended and disadvantageous torsional twisting of the ring is caused by unbalanced ring cross section profiles, so that both the effect of gas pressure acting on the ring and internal stresses set up in the ring by the manufacturing process tend to twist the ring out of a desired flat seating engagement with its associated groove, resulting in poor sealing and consequent gas blow-by.

SUMMARY OF THE INVENTION

The present invention overcomes the foregoing and other disadvantages by providing a piston ring having a circumferentially extending recess formed in the upper-outer portion of the ring to define a radial ledge which divides the outer axial surface into a recessed outer face and an axial bearing surface. The recessed outer face has an outside diameter which is less than the outside diameter of the bearing surface by an amount which is at least equal to the radial wear depth of the bearing surface. The radial wear depth is that amount of reduction in dimension (caused by wear of the bearing surface) which will end the useful operating life of the ring.

A circumferentially extending recess is also formed in the upper-inner portion of the ring. The respective dimensions and configuration of the inner and outer recesses are selected to balance the ring against torsional and gas pressure forces.

One result of the foregoing construction is that the area of the bearing surface is considerably reduced whereby frictional resistance to movement of the ring relative to the cylinder wall is greatly reduced. Further, the recessed outer face provides a pressure surface on which combustion gases act to help reduce diametral bearing pressure of the ring on the cylinder wall. In addition, the inner peripheral recess is dimensioned relative to the outer recess to balance the ring against torsion-inducing internal stresses.

In one preferred embodiment, the inner peripheral recess is similar or identical in configuration to the outer peripheral recess so that an inner radial ledge divides the inner peripheral surface into an offset inner surface whose inside diameter is greater than the inside diameter of the ring, and an axial, radially innermost surface, and the ring has an inverted T cross section. The outer radial ledge (or its radially outermost portion if the ledge is sloped away from the horizontal) is located between the upper and lower radial surfaces of the ring at a substantial axial distance downwardly from the upper radial surface, which distance is at least about 20%, preferably between about 20 to 60%, of the axial width of the ring. Accordingly, the bearing surface comprises between about 80 to 40% of what the total axial outer surface of the ring would be without the outer recess. The recessed outer face thus stops short of the lower radial surface. The ring is preferably made from a casting or other base stock of uniform axial width so that both the upper and lower radial surfaces are substantially flat and parallel to each other.

In accordance with another preferred embodiment of the invention, any suitable hard, wear-resistant facing may be applied to the bearing surface. The radially innermost extent of the hard facing alloy defines the radial depth of penetration of the alloy on the ring. Preferably, but not necessarily, the hard facing alloy is deposited in a circumferential groove formed for that purpose in the bearing surface. Preferably, a ferromolybdenum coating such as that of U.S. Pat. No. 3,819,384 is used.

It is an object of the present invention to provide an improved piston ring, more specifically to provide a split annular compression ring of improved configuration exhibiting reduced frictional resistance to movement against the cylinder wall, reduced blow-by of gases past the ring and decreases in fuel consumption and hydrocarbons and carbon oxides exhaust emissions.

It is another object of the present invention to provide a compression piston ring having formed at its upper-outer portion a recess of generally L-shaped configuration to define a radial ledge, the radially outermost portion of which is positioned downwardly from the top radial surface of the ring a distance equal to between about 20 to 60% of the total axial width of the ring, which ledge has a radial depth greater than the radial wear depth of the bearing surface of the ring, and to provide the ring with a recess in its upper-inner portion to minimize internal torsional twist stresses in the ring.

It is yet another object of the invention to provide an improved piston ring as hereinabove described which includes a hard facing coating on the axial bearing surface, preferably a ferro-molybdenum coating.

BRIEF DESCRIPTION OF THE DRAWINGS

Other objects and advantages of the invention will be apparent from the following description of preferred embodiments thereof together with the accompanying drawings which form a part hereof and wherein:

FIG. 1 is a partial view in elevation of the top portion of a piston for an internal combustion engine showing several piston rings disposed in grooves in the piston head, including an embodiment of the compression ring of the present invention in the topmost groove;

FIG. 2 is an enlarged section view taken along lines II—II of FIG. 1;

FIG. 3 is a plan view of one embodiment of the ring of the present invention;

FIG. 4 is a view in elevation of the ring of FIG. 3;

FIG. 5A is a partial perspective view taken along arrow A of section V—V of FIG. 3;

FIG. 5B is a view corresponding to that of FIG. 5A but taken along arrow B of FIG. 3;

FIG. 6A is a view corresponding to FIG. 5A showing another embodiment of the invention;

DETAILED DESCRIPTION OF THE DRAWINGS

Figure 7:
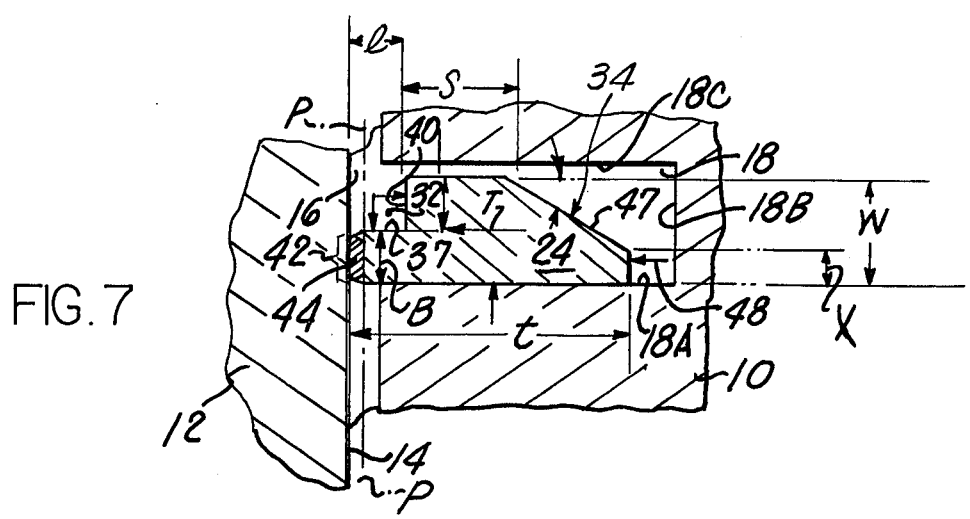
FIG. 7 is a fragmentary cross sectional view of a piston ring in accordance with one embodiment of the invention, received within its groove in a piston head disposed within the cylinder of an internal combustion reciprocating piston engine.

FIGS. 1 and 2 show a piston 10 of conventional type used in reciprocating piston internal combustion engines. As such, piston 10 is disposed within a cylinder 12 which has a cylinder wall 14. An annular space 16 is defined between cylinder wall 14 and the axial surface 11 of piston 10. As is conventional, a top ring groove 18, a middle ring groove 20 and an oil ring groove 22 are formed in piston 10. Top ring groove 18 receives therein a split annular compression or fire ring 24, middle groove 20 receives therein a annular compression ring and oil groove 22, which is usually wider than the compression grooves, receives therein a conventional expander-loaded oil ring 28.

Referring to FIGS. 3 and 4, compression ring 24 is shown in its uncompressed state. As seen in FIG. 3, ring 24 is approximately circular in configuration. However, those skilled in the art will recognize that conventional practice calls for a split annular rings to be made so that they are slightly out of round in the uncompressed state, and in such a manner that when the ring is compressed within its ring groove, the outer diameter of the compressed ring adopts a more nearly circular configuration.

As shown in FIG. 3, ring 24 has an inside diameter indicated by the dimension arrow ID, and an outside diameter indicated by the dimension arrow OD. (The dimension arrows ID, BOD, and FOD pass through the longitudinal axis L of ring 24 and may be considered as applied to the ring in its compressed condition, with gap 30 closed.) Dimension arrow FOD indicates the outside diameter of the recessed outer face 40 (FIGS. 4, 5A). Recessed face 40 outside diameter FOD is seen to be less than ring 24 outside diameter OD by the distance 1, the radial depth of ledge 37 (FIG. 5A). FIG. 4 is drawn out of scale with its axial width dimension exaggerated to more clearly show the structural features. The axial width of ring 24 is indicated by the dimension arrow W in FIG. 4.

Compression ring 24 is split and when the ring is uncompressed the end faces formed by the split are spaced from each other so that a gap 30 exists. A circumferentially extending (outer) recess 32 is formed in the upper outer diameter of ring 24 as best seen in FIG. 4. A second circumferentially extending (inner) recess 34 extends along the upper inside diameter of ring 24. Ring 24 has a top radial surface 36 and a bottom radial surface 38, both of which are substantially planar, i.e., flat without grooves or other recesses formed therein. Outer recess 32 is seen to be substantially L-shaped in cross section and extends downwardly from upper radial surface 36 a distance equal to about 60% of the axial width W of ring 24.

Referring now to FIG. 5A and FIG. 5B, circumferentially extending outer recess 32 defines an outer radial ledge or inwardly extending surface 37 which divides outer surface 33 into a first outer axial bearing surface 42 and a second outer axial recessed surface 40. Ledge 37 and bearing surface 42 define an outer radial shoulder 39 projecting radially outwardly from recessed outer face 40. It will be seen, therefore, that the first outer axial bearing surface 42 extends upwardly from the lower radial surface 38 and terminates at the intermediate inwardly extending surface 37. The intermediate inwardly extending surface 37 terminates at a second outer axial recessed surface 40 which in turn terminates at the upper radial surface 36. As shown in FIG. 7, the second outer axial recessed surface 40 has a maximum radial dimension which is less than the radius of the piston 10 when the ring 24 is in the groove 18 and in the cylindrical bore 14. The first outer axial bearing surface 42 has a groove 46 formed therein. A hard facing alloy 44 is deposited within groove 46.

Dimension arrow A in FIG. 5A indicates the extent to which outer face 40 extends downwardly from upper radial surface 36 towards lower radial surface 38 along outer axial surface 33 of ring 24. Dimension arrow B indicates the corresponding extent of bearing surface 42. Preferably, dimension A is 20 to 60% of dimension W, and dimension B accordingly is 80 to 40% of dimension W, the sum of A and B being equal to W. Bearing surface 42 thus is reduced to approximately 40 to 80% of what it would be if there were no outer recess 32 and the full cylindrical outer axial surface served at the bearing surfce. It will be recognized that in most cases the effective bearing surfaces are reduced slightly by lapping of the edges of the bearing surface to provide a desired "barrel" shape. This is shown in the rounded edges 42A, 42B of FIGS. 5A, 5B, and is typical also of prior art practice.

Referring particularly to FIG. 5B, circumferential recess 34 is seen to have a flat, planar configuration which defines an inner peripheral relief 47 having an inside diameter greater than the inside diameter of the radially innermost surface 48 of ring 24.

FIG. 7 shows an enlarged schematic view in cross section of ring 24 in place within its ring groove 18. Groove 18 has a lower radial wall 18A, an upper radial wall 18C and an axial bottom wall 18B. With ring 24 compressed within ring groove 18 so that gap 30 is closed, an outwardly acting thrust represented by the arrow T urges ring 24 against cylinder wall 14 so that a bearing, sliding contact is made between axial bearing surface 42 and wall 14 as cylinder 10 reciprocates upwardly and downwardly (as viewed in the drawing) within cylinder 12. The total bearing area between ring 24 and wall 14 is seen to be but a percentage (preferably 80 to 40%) of what it would be if the entire outer axial surface 33, or almost the entire outer surface 33 were to be in bearing contact with wall 14 as is the case, for example, with the test ring (not an invention embodiment) of FIG. 8. The wall thickness of the ring 24 is indicated by the dimension arrow $t$, and the width by dimension arrow W. S is the radial thickness of upper radial surface 36, $l$ is the radial depth of radial length 37 and $a$ is the angle included between the surface of inner peripheral relief 47 and the plane of upper radial surface 36. The angle $a$ may be referred to as the inner relief angle. The axial width of radially innermost surface 48 is shown by the dimension $x$. As shown in FIG. 7, the inner axial surface of the ring 24 includes a first inner axial surface portion 49 (FIG. 5A) or 71 (FIG. 6A) which extends upwardly a distance $y$ from the lower radial surface 38 to an intermediate circumferential line 51 (FIG. 5B) or 73 (FIG. 6A) and is in confronting relation with the bottom 18B of the groove 18 in the piston 10. A second inner peripheral relief surface portion 47 extends between the termination of the first inner axial surface portion 49 and the upper radial surface 36. The diameter of the inner peripheral relief surface 47 at its termination at the upper radial surface 36 is greater than the inside diameter of the ring at the circumferential line 51.

Figure 8:
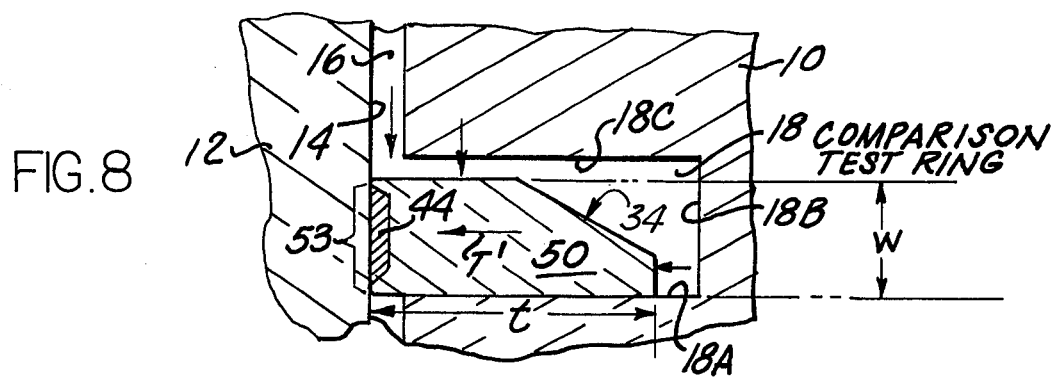
FIG. 8 is a view corresponding to FIG. 7 but showing a test piston ring not an embodiment of the invention.

FIG. 8 shows a test ring (not an invention embodiment) in which a compression ring 50 has substantially the entire outer axial surface thereof (less beveled edges) in bearing contact with cylinder wall 14. The wall thickness of ring 50 is shown by dimension arrow $t$, and the width by dimension arrow W. The total thrust of ring 50 bearing outwardly against cylinder wall 14 is indicated by the arrow T. The larger bearing surface 53 of ring 50 in contact with wall 14 provides a greater frictional resistance to movement of ring 50 and its associated piston 10 relative to cylinder 12.

Referring again to FIG. 7, the short unnumbered arrows shown directed against the various upper surfaces of ring 24 represent the force vectors of compressed combustion gases entering annular space 16 and acting on ring 24. Such forces are exerted during the compression and power strokes of the piston. As shown in FIG. 7, the net effect of gas pressure acting against surfaces 37, 36, 47 and 48 is to augment the outwardly acting thrust represented by the arrow T. This net outwardly acting thrust is at least partially offset by the force of the gas acting against recessed outer face 40 as indicated by the arrow impinging thereon. Thus, the face 40 causes the tendency of the exploding combustion gases to provide an outwardly acting thrust on ring 24 to be considerably reduced. This substantially reduces the diametral pressure of the ring against the cylinder wall. It will be noted that with the full bearing face contact of test ring 50 of FIG. 8, no equivalent to recessed outer face 40 is provided, so that the entire effect of the combustion gas pressure is to augment the outward thrust T' of ring 50 against surface 14. Consequently, with other things equal, T of ring 24 is less than T' of ring 50 so that bearing pressure and frictional resistance is lessened.

Referring again to FIG. 7, as axial bearing surface 42 wears down in use, the compression tension of ring 24 will cause the ring to correspondingly expand outwardly to maintain bearing surface 42 in bearing sliding contact with cylinder wall surface 14. The section line P—P shows, in exaggerated fashion for clarity of illustration, the relative position of cylinder wall 14 to ring 24 after a considerable amount of wear has been sustained by axial bearing surface 42. Because of the L-shaped configuration of the outer circumferential recess 32, the effective gas pressure surface provided by recessed outer face 40 is unaffected regardless of the extent of wear of bearing surface 42. In this manner, the beneficial gas pressure balancing effect provided by recessed outer face 40 is not adversely affected by wear sustained by bearing surface 42. For this reason, it is an important feature of the invention that the outer diameter (FOD in FIG. 3) of the recessed face 40 is less than the outside diameter (OD in FIG. 3) of the ring by an amount which is at least as great as the radial wear depth of the ring bearing surface. In this manner, as the bearing surface (42 in FIG. 5A and which, in all cases, defines the outside diameter of the ring) wears down in use, no part of the effective gas surface provided by the recessed outer face (40 in FIG. 5A) is brought into contact with cylinder wall 14. Usually, the radial wear depth is less than the radial depth of the hard facing coating (44 in FIG. 5A) applied to the bearing surface of the ring. Preferably, the radial depth $l$ of the ledge (37 in FIG. 5A) is much greater than the radial wear depth of the bearing surface, so the recessed face (40 in FIG. 5A) is unaffected by bearing surface wear. Otherwise stated, preferably the outside diameter of the outer bearing face terminates short of the depth of radial penetration of the hard facing alloy on the ring bearing surface. The bearing surface is usually circumferentially grooved to receive the alloy, although obviously it need not be and the hard facing alloy can be deposited on an ungrooved bearing surface.

While in the preferred embodiment illustrated, ledge 37 is shown approximately parallel to the radial surfaces 36, 38 and approximately perpendicular to recessed surface 40, such arrangement is not necessary in accordance with the invention. The radial ledge and recessed outer face may, of course, intersect each other at an angle other than 90%. In general, the outer recess (32 in FIG. 5A) may have in accordance with the invention, a cross section profile formed of two or more intersecting line segments. The line segments may be straight or even curved, or some straight and some curved. For example, the profile of recess 32 in the FIG. 5A embodiment may be modified by a curved fillet formed at the intersection of ledge 37 and face 40; ledge 37 may be sloped upwardly or downwardly towards face 40; face 40 may be sloped inwardly or outwardly; face 40 and/or ledge 37 may be formed with other than the straight-line profile illustrated. All such modifications are within the scope of the invention provided that the recessed outer face is recessed sufficiently with respect to the bearing surface that the wear of the bearing surface to the radial wear depth does not affect any significant reduction of the effective gas surface provided by the recessed outer face. It will be appreciated that if the design of the ring is such that ledge 37 slopes upwardly towards the recessed face (4). The effective gas area provided by the recessed face is slightly reduced; if it slopes downwardly the effective gas area of the recessed face is slightly enhanced.

Figure 9:
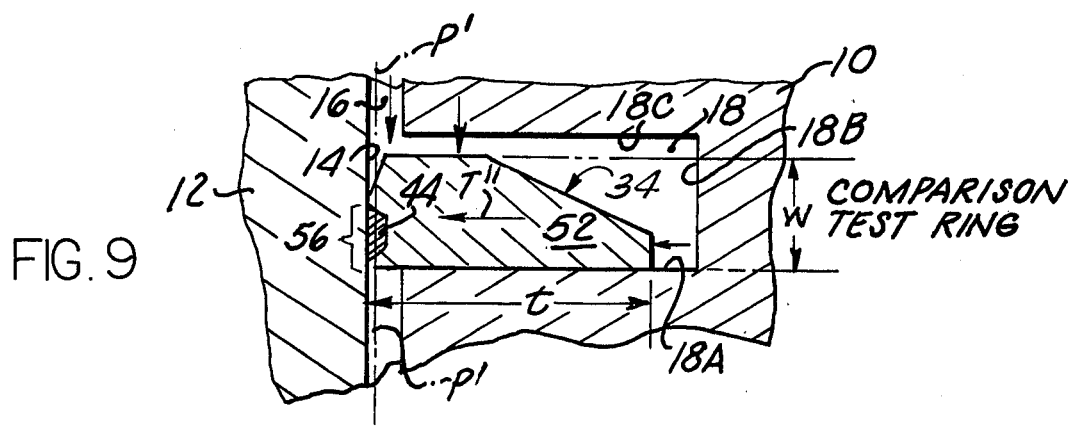
FIG. 9 is a view corresponding to FIG. 8 but showing another test piston ring not an embodiment of the invention.

This is to be compared with the test ring of FIG. 9, wherein a ring 52 having a bearing face conforming to the prior art has sloped outer face 54 which provides a bearing surface 56 of reduced area. The wall thickness of ring 52 is shown by the dimension arrow t, and the width by dimension arrow W. The net outwardly acting thrust of ring 52 against cylinder wall 14 is indicated by the arrow T". Combustion gas pressure forces acting on ring 52 are indicated by the short unnumbered arrows shown in FIG. 9. Assuming that axial bearing surface 56 of FIG. 5A is identical to axial bearing surface 42 of ring 24 in FIG. 7, it will be appreciated that frictional resistance of ring 52 is reduced and that sloped outer face 54 provides an effective gas surface tending to balance a portion (but a lesser portion than that provided by ring 24) of the gas forces acting outwardly on the ring. However, as face 56 sustains wear, the relative position of cylinder wall 14 changes as indicated by line P'—P', in exaggerated fashion for clarity of illustration. It will be observed that with increasing wear of bearing surface 56 the area of sloped outer face 54 available to act as an effective gas pressure surface to balance the outwardly acting gas pressure forces is considerably reduced and in an extreme case would tend towards being entirely eliminated as the entire outer axial surface of ring 52 comes into bearing contact with cylinder wall 14. It should be noted that conventional prior art practice is to provide only a very slight slope, usually one to three degrees, to sloped face 54.

As is known in the art, it is sometimes desired to provide a slight torsional twist to a piston ring rather than to strive for a flat configuration. Provision of the circumferentially extending outer recess 32 would normally cause the piston ring such as ring 24 to "dish" in a reversed torsion manner, that is, the inner periphery of the ring would tend to be twisted upwardly and the outer periphery would tend to be twisted downwardly. Such twisting is of course relatively slight yet nonetheless it is important in changing the angle of contact of the ring with the cylinder wall and in raising the ring from flat seating contact within its groove. In accordance with the present invention, it is desired to reduce or substantially eliminate such torsion twisting of the ring to enhance flat sealing contact of lower radial surface 38 against the bottom radial wall 18A of groove 18.

Calculations of the diametral force against the wall of the cylinder of a number of differently configured rings were made and are summarized in the following Table. The diametral force is the force with which the ring bears against the cylinder wall at peak combustion pressure.

TEST RESULTS
Dimensions Common To All Rings
Bore Diameter = 4.000 inches
Wall thickness (t in FIGS. 7, 8 & 9) = 0.182 inch (.177 .187 inch, (SAE int. wall)
Width (W in FIGS. 7, 8 & 9 = 0.078 inch
Peak Combustion = 800 psi
Ring Diametral Tension - 0 (dead ring)

-continued

Diametral Force Calculated for Different Rings

| Bearing surface (42 in FIG. 7, 53 in FIG. 8, 56 in FIG. 9) as percent of total cylindrical outer axial surface of ring | FIG. 7 Type Ring but without an inner circumferentially extending recess | FIG. 7 Type Ring | FIG. 8 Type Ring | FIG. 9 Type Ring |
|---|---|---|---|---|
| | Calculated Diametral Force - LBS. | | | |
| 10% | — | — | — | 24.6 |
| 40% | 247 | 264 | — | — |
| 50% | — | — | — | 338 |
| 60% | 402,407* | — | — | — |
| 80% | 558 | 575 | — | — |
| 100% | — | — | 718–730** | — |

*For 2 rings having different depth of radial ledge (1 in FIG. 7) but otherwise identical.
**For 4 rings having differently sized inner circumferentially extending recesses, but otherwise identical.

The reduction in diametral force when the bearing surface is reduced to 10% of the theoretical cylindrical outer axial surface is so great that effective sealing against gas blow-by is not attained. On the other hand, when the bearing surface is more than 90% of theoretical, significant reduction in the diametral pressure and frictional resistance is not attained.

It has been found that optimum results of a substantial reduction in frictional resistance and good sealing against gas blow-by are obtained when the bearing surface comprises more than 10% and less than 90%, preferably, 40 to 80%, of the theoretical cylindrical outer axial surface of the ring, i.e., preferably 40 to 80% of what the bearing surface would be if there were no recessed outer face formed therein. (The preferred range corresponds to the outer radial ledge being positioned 60% to 20% downwardly from the top radial surface.)

In a preferred construction, the axial width W is about 0.078 inch, and the outer radial ledge is positioned about 0.038 inch downwardly from the top radial surface, or about 49% of the axial width.

It has further been found that, surprisingly, good sealing against gas blow-by and emissions reduction is enhanced with the ring of the invention despite the reduced diametral force of the ring. (The reduced bearing surface of course provides an increased diametral pressure for a given diametral force, which helps to offset the reduced force.) This surprising result may also be aided by making the lower radial surface of flat, undished configuration and maintaining it in good sealing contact with the bottom of the ring groove in which the ring is seated by eliminating torsional thrust in the ring.

Referring to FIG. 7, in order to balance the torsion twisting effect of circumferential recess 32, an inner circumferential recess 34 is provided. Recess 34 is dimensioned as desired either substantially to eliminate or reduce to a desired level the reverse torsional twist tendency imparted to ring 24 by outside circumferential recess 32. Inside circumferential recess 34 may be dimensioned not only to overcome the reverse torsional twist tendency but to avoid giving to the ring a net normal torsion twist tendency. That is, to cause the ring 24 to be dished in such a manner that the outer periphery portion thereof is twisted upwardly thereof and the inner periphery portion thereof is twisted downwardly. (Illustrations of reverse torsional twist and normal torsional twist are given, respectively, in FIGS. 6 and 9 of the aforementioned U.S. Pat. No. 3,337,938.)

Generally, a preferred embodiment of the invention has the effective inner and outer circumferential extending recesses 32 and 34 so dimensioned that the torsional twist tendency of the ring is substantially balanced out and a flat, non-dished ring is produced with a lower radial surface 38 which seats in flat, planar contact with bottom wall 18A of its associated groove 18. In a preferred embodiment as illustrated in FIG. 7, inner relief angle $a$ is 25°, the radial thickness $s$ of upper radial surface 36 is one-third of $t$, the wall thickness, and the rdial depth $l$ of radial ledge 37 is equal to $x$, the axial width of radially innermost surface 48. The sum of A plus B (the axial widths, respectively, of outer face 40 and bearing surface 44) are equal to W, the total axial width of ring 24. A is equal to between about 20% to 60% of W. In a preferred specific embodiment, W equal 0.078 inch, $t$ equals 0.182 inch and x and $l$ each equal .02 inch, with $a$ equal to 25°, and A equal to 60% of W. Obviously, any dimensions may be employed as required so long as the precepts of a reduced bearing surface, recessed outer face, and balancing inner recess or relief are followed.

Referring now to FIG. 6A, there is shown another embodiment of the invention comprising a piston ring 58 having an outer circumferentially extending recess 60 and an inner circumferentially extending recess 62, recesses 60 and 62 both being of substantially L-shaped cross section. Accordingly, ring 58, has an outer radial shoulder 64 and an inner radial shoulder 66, and a recessed outer face 68 and a recessed or offset inner face 70. Shoulder 64 provides an outer radial edge 67 and shoulder 66 provides an inner radial edge 77. Top radial surface 72 extends between faces 68 and 70 and bottom radial surface 74 extends between the radially innermost and radially outermost portions of ring 58. A groove 76 is formed within axial bearing surface 78 provided by the radially outermost portion of outer radial shoulder 64. Groove 76 is filled with a hard facing material 18. Ring 58 is seen to have an inverted T-cross section. The radial depth of outer ledge 67 is shown as 1, that of inner ledge 77 as 1'. The axial width of ring 58 is shown as W, that of recessed outer face 68 is shown as A, that of axial bearing surface 78 is shown as B. The axial width of recessed inner face 70 is shown as A', and that of innermost axial surface 71 is shown as B'. A may or may not be equal to A', although it is in a preferred embodiment. Similarly, 1 may or may not be equal to 1', although it is in a preferred embodiment. A plus B equals W, and A' plus B' equals W. It will be appreciated that ring 58 of FIG. 6A provides the same advantages of the invention as does ring 24 in providing a reduced bearing surface 78 and an effective surface 60 against which combustion gas pressure may act to offset at least partially the outwardly acting thrust effects of combustion gas pressures. Ring 58 also provides the torsion twist balancing feature. It will be appreciated that the respective circumferentially extending recesses 60, 62 of ring 58 may be either identical in dimensions or slightly different in dimension.

In operation, compression piston rings in accordance with the invention have shown distinct advantages over prior art compression rings. For example, piston rings of the embodiment of the invention illustrated in FIG. 7 were tested against prior art rings of the embodiment illustrated in FIGS. 9 and 10. The FIG. 7 type rings were dimensioned such that radial shoulder 37 was located at a point 60% of the total axial width below the upper radial surface. Comparison tests were carried out by utilizing rings of the above described configuration in a Buick 455 cubic inch displacement engine which was run at given speed and horsepower output in a series of runs utilizing, respectively, rings according to FIGS. 7, 8 and 9. Manifold vacuum pressure, fuel consumption, and the hydrocarbons and carbon monoxide content of the engine exhaust were continually monitored during engine operation. The result of the tests are shown in the graphs of the FIGS. 10, 11, 12 and 13.

Figure 10:
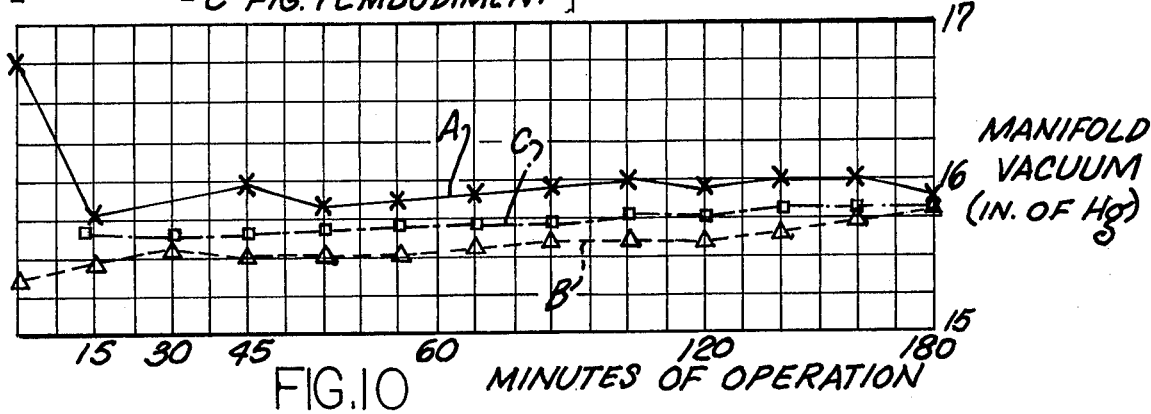
FIGS. 10 through 13 are graphs plotting minutes of engine operation of, respectively, piston rings illustrated in FIGS. 7, 8 and 9, against engine performance parameters, as follows: manifold vacuum in inches of mercury (FIG. 10); fuel consumption in pints per hours (FIG. 11); observed hydrocarbons in engine exhaust in parts per million (FIG. 12); and observed carbon monoxide in volume percent (FIG. 13)

Referring to FIG. 10, manifold vacuum in inches of mercury is plotted against minutes of operation. The graph shows manifold vacuum measured over 3 hours of engine operation under identical operating conditions in the same engine save for the employment of, respectively, the FIGS. 7, 8 and 9 rings as the top compression rings of the engine. It will be noted that a consistently higher manifold vacuum is attained when employing the piston rings of the invention, i.e., the FIG. 7 embodiment thereof indicated by the line A. Lines B and C show, respectively, the manifold vacuum in inches of mercury measured when employing the test piston rings of FIGS. 8 and 9.

Figure 11:
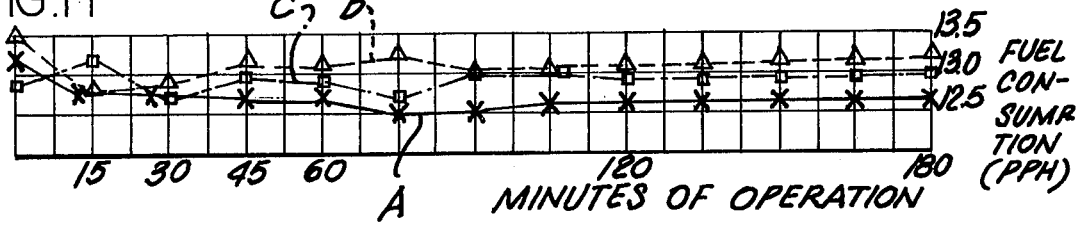

FIG. 11 shows the rate of fuel consumption measured at 15 minute intervals during engine operation. Generally, in operation as indicted by line A with the FIG. 7 embodiment of the invention, a generally lower rate of fuel consumption was required by the engine. This is attributed to the reduced frictional resistance between the ring and the cylinder wall an a more effective sealing by the balanced, flat seating ring of FIG. 7.

Figure 12:
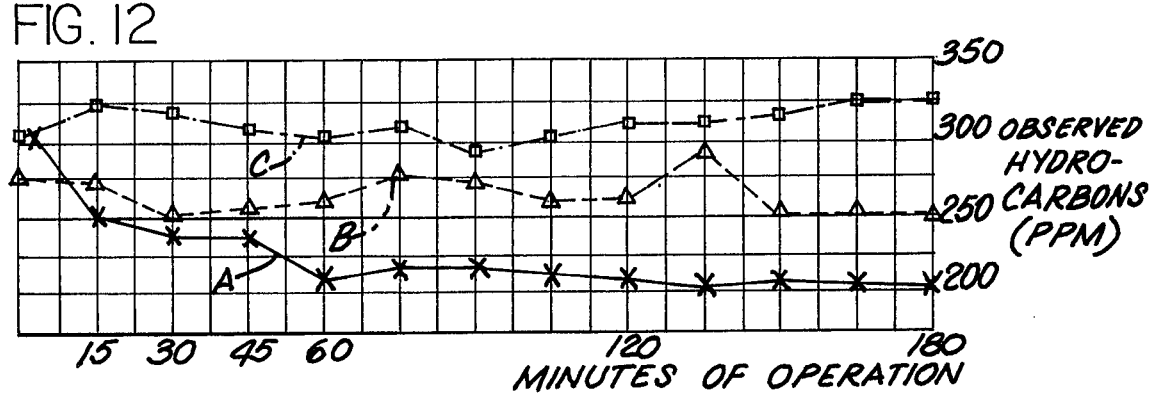

FIG. 12 shows the observed hydrocarbons in the engine exhaust in parts per million. Significantly cleaner exhaust in terms of hydrocarbons content when employing the piston ring in accordance with the invention is indicated by line A. Lines B and C both show substantially higher hydrocarbon content for the FIG. 8 and 9 test rings.

Figure 13:
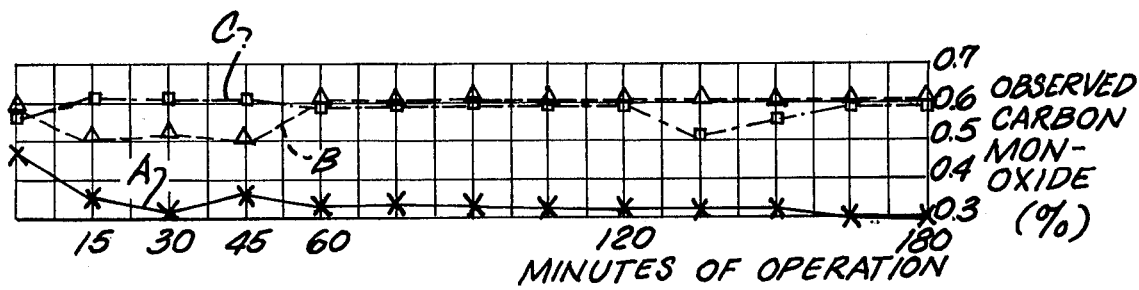

FIG. 13 shows the observed carbon monoxide present in the engine exhaust as percent of the total engine exhaust. The favorable results provided when employing the piston ring of the invention is indicated by the line A. Lines B and C both show noticably higher carbon monoxide contents when using the rings of FIGS. 8 and 9.

As indicated by visual examination of all the tested rings after the engine operation, it appears that the reasons for the superior showing of the ring of FIG. 7 as compared to the other two rings tested was its better facility for pressure balancing despite its lower diametral force, as compared to the rings of FIGS. 8 and 9. The low inherent twist of the balanced inside and outside diameter recesses enables the ring of the FIG. 7 embodiment to rest flat on the bottom wall of the groove, and this appears to be responsible for reducing the amount of combustion gas which by-passes the rings. The rings of FIGS. 8 and 9 exhibited signs of a torsional twist which, while possibly desirable in some applications, does not appear to provide good sealing as combustion gases drive the ring downwardly and rearwardly in the groove.

Piston rings in accordance with the invention can be made as follows. For rings to be grooved to receive a hard facing alloy, circumferential grooves are cut in the bearing surface of the ring. This may be accomplished in the known manner by engaging cutting tools with a plurality of rings which are clamped on an arbor to form a stacked cylinder of rings. After the bearing surface grooves are cut, the surface of the stacked rings is sprayed with a hard facing alloy. The hardened alloy is then ground down to expose the ring metal on either side of the grooves, leaving the grooves filled with the hard facing alloy. The outer circumferential recesses may then be cut in the rings in a manner similar to that in which the grooves were cut. The inner circumferential recesses may similarly be cut by a plurality of cutting tools inserted through a hollow shaft on the mounting arbor. Alternatively, to cut the inner and outer recesses, individual rings may be held in a clamping device and the inner and outer circumferential recesses cut simultaneously by a pair of oppositely facing cutting tools.

While specific embodiments of the invention have been described in detail, it will be appreciated that numerous modifications thereto can be made by those skilled in the art after reading and understanding of the foregoing specification. It is intended to include all such modifications and alterations within the scope of the appended claims.

What is claimed is:

1. In combination in an internal combustion engine, a piston, a cylindrical bore in which said piston reciprocates and an annular piston ring adapted to be received in a groove in said piston, said piston ring having an upper radial surface, a lower radial surface substantially parallel to the upper radial surface, a first outer axial bearing surface which extends upwardly from the lower radial surface and terminates at an intermediate inwardly extending surface, which intermediate surface terminates at a second outer axial recessed surface and which second outer axial recessed surface terminates at said upper radial surface, an inner axial surface which extends between the upper and lower radial surfaces and against which gas pressure in the groove in said piston acts to urge said piston ring radially outwardly, said second outer axial recessed surface providing a surface against which gas pressure in said bore exerts a radially inwardly directed force to offset at least in part the radially outwardly directed force exerted by the gas pressure acting on said inner axial surface, and which radially inwardly directed force does not appreciably change during the life of the ring, said second outer axial recessed surface having a maximum radius less than the radius of said piston when said ring is in the groove in the piston and in the cylindrical bore of said internal combustion engine.

2. The combination of claim 1 wherein the inwardly extending radial surface of the piston ring is perpendicular to the second axial recessed surface and the second axial recessed surface is parallel to the longitudinal axis of the ring.

3. The combination of claim 1 wherein the upper and lower radial surfaces of the piston ring are parallel to each other and perpendicular to the second axial recessed surface, and the recessed outer face is parallel to the longitudinal axis of the ring.

4. The combination of claim 3 wherein the intermediate inwardly extending radial surface of the piston ring is perpendicular to the recessed outer face.

5. The combination of claim 1 wherein the lower radial surface of the piston ring is substantially flat.

6. The combination of claim 5 wherein the lower radial surface of the piston ring is ungrooved and extends from the inner axial surface to the first outer axial bearing surface.

7. The combination of claim 1 wherein the radially outermost portion of the intermediate inwardly extending radial surface of the piston ring is positioned downwardly from the radially outermost portion of the upper radial surface a distance which is greater than about 10% and less than about 90% of the axial width of the ring.

8. The combination of claim 7 wherein the intermediate inwardly extending radial surface of the piston ring is positioned at a distance between about 20% to 60% of the axial width of the ring.

9. The combination of claim 1 wherein the inner axial surface includes a first inner axial surface portion which extends upwardly from the lower radial surface and terminates at an intermediate circumference between the upper and lower radial surfaces, said first inner axial surface being in confronting relation with the bottom of the groove in said piston, and a second inner peripheral relief surface portion which extends between said intermediate circumference and said upper radial surface, the diameter of said inner peripheral relief surface at said upper radial surface being greater than the inside diameter of the ring at said intermediate circumference.

10. The combination of claim 1 wherein the first axial bearing surface has a hard facing thereon.

11. An annular piston ring for an internal combustion engine having an upper radial surface which defines the upper portion of the ring, a lower radial surface which defines the lower portion of the ring and, extending between said upper and lower radial surfaces has, respectively, an outer axial surface which defines the outer portion of the ring and an inner axial surface which defines the inner portion of the ring, a circumferentially extending recess formed in the upper-outer portion of the ring to define an outer radial shoulder having an outer radial ledge which divides the outer axial surface into a recessed outer face and an axial bearing surface, the bearing surface having a hard facing alloy thereon, the difference between the radius of the outside of the recessed outer face and the radius and said axial bearing surface being greater than the radial thickness of the hard facing alloy on the ring, and a circumferentially extending inner peripheral relief formed in the upper-inner portion of the ring said relief having an inside diameter greater than the inside diameter of the ring.

12. The piston ring of claim 11, wherein a circumferential groove is formed in the bearing surface and the hard facing alloy is disposed therein.

13. The ring of claim 11 wherein the lower radial surface is a substantially flat, ungrooved surface extending between the inner and outer axial surfaces.

14. The piston ring of claim 13 wherein the upper and lower radial surfaces of the ring are parallel to each other and perpendicular to the recessed outer face.

15. The ring of claim 11 wherein the outer radial ledge is perpendicular to the recessed outer face and the recessed outer face is parallel to the longitudinal axis of the ring.

16. The piston ring of claim 11 in a groove in a piston in an internal combustion engine and wherein the radially outwardly directed force created by gas pressure exerted on the inner axial surface of the ring is at least partially offset by a radially inwardly directed force created by gas pressure exerted on the recessed outer face of the ring, and wherein the radially inwardly directed force does not appreciably change during the life of the ring.

* * * * *